United States Patent
Martens et al.

(10) Patent No.: US 10,375,124 B2
(45) Date of Patent: Aug. 6, 2019

(54) PUBLISH/SUBSCRIBE NETWORK ENABLED FOR MULTIMEDIA SIGNALING CONTROL, METHOD FOR INITIATING A SESSION WITHIN THE NETWORK AND RESPECTIVE NETWORK DEVICE

(71) Applicant: THOMSON LICENSING, Issy les Moulineaux (FR)

(72) Inventors: Kristof Martens, Haacht (BE); Jurgen Schoeters, Ranst (BE); Bart Nys, Kessel (BE); Alex De Smedt, Olen (BE); Paul Praet, Antwerp (BE)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 11 days.

(21) Appl. No.: 15/303,733

(22) PCT Filed: Apr. 16, 2015

(86) PCT No.: PCT/EP2015/058291
§ 371 (c)(1),
(2) Date: Oct. 12, 2016

(87) PCT Pub. No.: WO2015/158840
PCT Pub. Date: Oct. 22, 2015

(65) Prior Publication Data
US 2017/0041352 A1 Feb. 9, 2017

(30) Foreign Application Priority Data
Apr. 17, 2014 (EP) .................... 14305574

(51) Int. Cl.
*H04L 29/06* (2006.01)
*H04L 12/18* (2006.01)
*H04L 29/08* (2006.01)

(52) U.S. Cl.
CPC ...... *H04L 65/1069* (2013.01); *H04L 12/1818* (2013.01); *H04L 65/1093* (2013.01); *H04L 65/403* (2013.01); *H04L 67/10* (2013.01)

(58) Field of Classification Search
CPC ... H04L 65/403; H04L 12/1818; H04L 67/10; H04M 3/5687
See application file for complete search history.

(56) References Cited

U.S. PATENT DOCUMENTS 7,877,453 B2 * 1/2011 Alexander ............ H04L 65/605
709/207
7,945,612 B2 * 5/2011 Raghav ................ G06Q 10/107
709/201

(Continued)

FOREIGN PATENT DOCUMENTS

EP 1519578 3/2005
KR 2013063920 6/2013

OTHER PUBLICATIONS

Cerqueira et al., "A Unifying Architecture for Publish-Subscribe Services in the next Generation IP-Networks", IEEE Globecom 2006, San Francisco, California, USA, Nov. 27, 2006, pp. 1-5.

(Continued)

*Primary Examiner* — Lashonda T Jacobs
(74) *Attorney, Agent, or Firm* — Jerome G. Schaefer

(57) ABSTRACT

A method for initiating a session within a publish/subscribe network, comprises: publishing a first topic by a first user interface of a first device, the topic identifying the first user interface and including an address-identifier identifying a second user interface of another device, triggering a request to start a session, starting a first media endpoint (43, 44) by publishing the media endpoint to the network by using a second topic for the media end point representing the media end point and describing the capabilities of the media endpoint, and linking the first media endpoint with a second (Continued)

media endpoint (45, 46) of the second user interface (42), when the second user interface has accepted the session.

17 Claims, 14 Drawing Sheets

(56) References Cited

U.S. PATENT DOCUMENTS

| | | | | |
|---|---|---|---|---|
| 8,027,335 | B2* | 9/2011 | Ansari | H04L 12/2803 370/353 |
| 8,451,725 | B1* | 5/2013 | Cheung | H04L 65/1046 370/231 |
| 9,641,635 | B2* | 5/2017 | Bandyopadhyay | H04L 43/0805 |
| 9,706,371 | B2* | 7/2017 | Kaplinger | H04L 69/18 |
| 9,986,039 | B2* | 5/2018 | Martens | H04L 67/14 |
| 2005/0119913 | A1 | 6/2005 | Hornreich et al. | |
| 2005/0203949 | A1* | 9/2005 | Cabrera | H04L 67/02 |
| 2008/0227438 | A1 | 9/2008 | Fletcher | |
| 2009/0177764 | A1* | 7/2009 | Blatherwick | H04W 4/02 709/221 |
| 2011/0022705 | A1 | 1/2011 | Yellamraju et al. | |
| 2012/0246295 | A1 | 9/2012 | Gonzalez-Banos et al. | |
| 2014/0229504 | A1* | 8/2014 | Kim | G06F 16/2471 707/770 |
| 2015/0304429 | A1* | 10/2015 | Martens | H04L 67/14 709/202 |
| 2016/0105305 | A1* | 4/2016 | Pignataro | H04L 67/32 709/223 |
| 2017/0149869 | A1* | 5/2017 | Tarricone | H04L 67/10 |

OTHER PUBLICATIONS

Chaabane et al., "A Framework for Managing Composed Multimedia Delivery in Personal Networks", 2011 International Conference on Multimedia Computing Systems, Ouarzazate, Morocco, Apr. 7, 2011, pp. 1-6.

Garcia-Sanchez et al., "Energy-Efficient Mobile Middleware for SIP on Ubiquitous Multimedia Systems", 2008 International Federation for Information Processing, TC6 Networking Conference, Singapore, May 5, 2008, pp. 735-747.

* cited by examiner

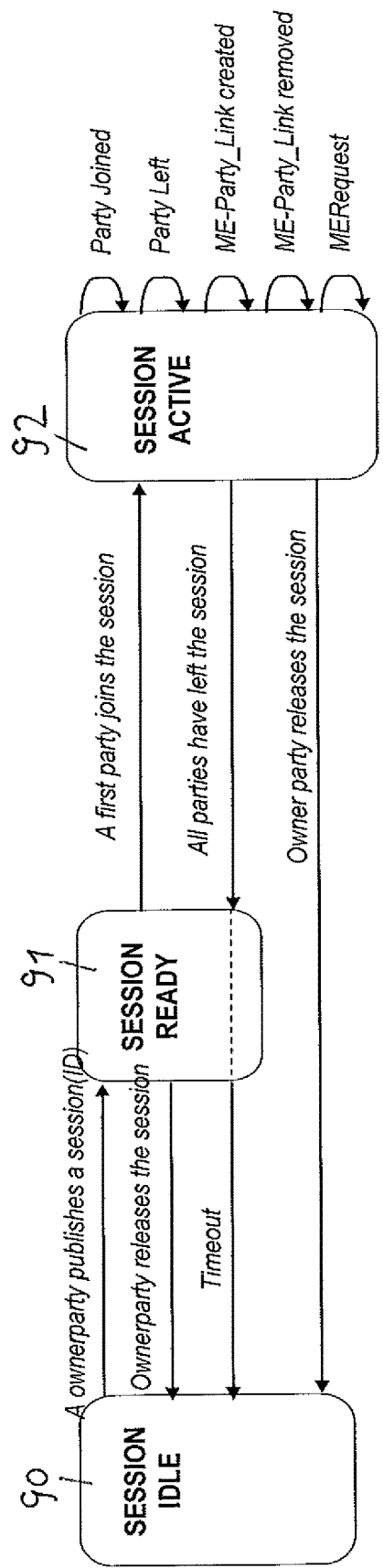
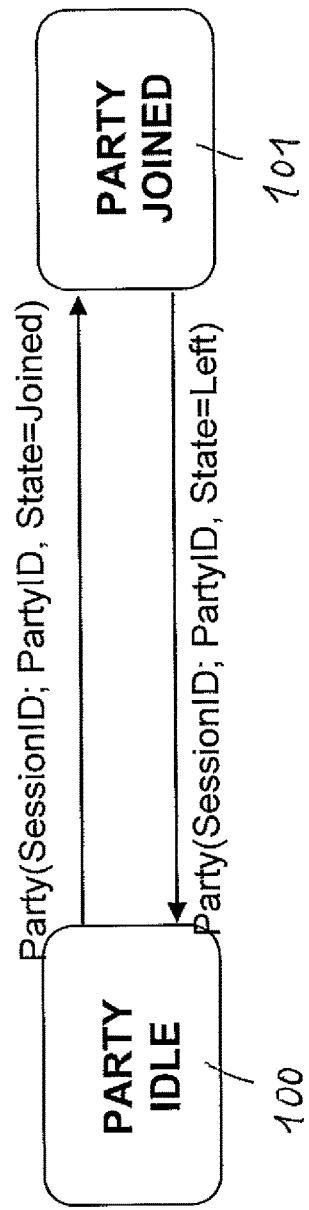
Fig. 9
Fig. 10

PUBLISH/SUBSCRIBE NETWORK ENABLED FOR MULTIMEDIA SIGNALING CONTROL, METHOD FOR INITIATING A SESSION WITHIN THE NETWORK AND RESPECTIVE NETWORK DEVICE

This application claims the benefit, under 35 U.S.C. § 365 of International Application of PCT/EP2015/058291, filed Apr. 16, 2015, which was published in accordance with PCT Article 21(2) on Oct. 22, 2015, in English, and which claims the benefit of European Application No. 14305574.7, filed Apr. 17, 2014.

TECHNICAL FIELD

The invention relates to the field of communications networks, for example to a home network including a residential gateway, adapted to operate via a broadband connection with a service provider network.

BACKGROUND OF THE INVENTION

Residential gateways are widely used to connect devices in a home of a customer to the Internet or to any other wide area network (WAN). Residential gateways use for example digital subscriber line (DSL) technology that enables a high data rate transmission over copper lines, or use optical fiber broadband transmission systems, e.g. fiber-to-the-home (FTTH) or fiber-to-the premises (FTTP).

Home networks have become part of everyday life for many customers. A home network consists of a range of heterogeneous devices, which means that the home network is made up of different kinds of devices. All these devices need to communicate with each other. For this interconnection, multiple solutions are available: The home network uses a mixture of solutions, such as wireless and wired network connections. Combining these devices creates a network that allows users to share information and control devices in the home. Examples of networked devices in the home are for example residential gateways, set-top boxes, TVs, personal computers, tablet PCs, smart phones, network-attached storage (NAS) devices, printers and game consoles.

DDS (Data Distribution Service for Real-Time Systems) is a standard governed by the Object Management Group (OMG). It describes a data-centric publish-subscribe middleware that can be used to build distributed real-time systems. Since its formal adoption as an OMG standard in the year 2004 it has become a popular technology used in many different industries such as the airline/aviation industry, the automotive industry, the military . . . . Several commercial and open-source implementations of the DDS standard exist.

Known signalling systems for setting up media sessions in an Internet Protocol (IP) environment are SIP, H.323, MGCP, Megaco, etc. These systems have the following characteristics:

They are using action based messages.
They are working on functions (protocol entities), that change (session) state based on the requested actions.
The control communication for setting up sessions is between dedicated entities, preconfigured or not.
A signalling control communication for setting up sessions ripples through multiple entities in the network.

In software architecture, Publish/Subscribe is a messaging pattern where senders of messages, called publishers, do not program the messages to be sent directly to specific receivers, called subscribers. Instead, published data is multicasted, without knowledge of what, if any, subscribers there may be. Similarly, subscribers subscribe to particular data, and only receive messages that are of interest, without knowledge of what, if any, publishers there are. Entities connected to a Publish/Subscribe-based network communicate on 'Topics' and value changes of its parameters that are published, to the ones subscribed.

In a Publish/Subscribe environment, the message approach, where a message is sent between dedicated entities is therefore no longer applicable:

Publish/Subscribe uses information exchange, rather than actions, on a Publish/Subscribe basis, an on a 'Topic' basis. The Topic has a name, and contains some parameters, which can take specific values.
If an entity wants to receive some information, it needs to subscribe to a topic representing the information, on a filtering basis (topics, parameters, values).
"Publish" means that topic changes, including parameters, are sent around, in principle to any entity that is listening; this can include multiple entities, not only just one.
An entity should only be listening when it has 'subscribed' to a topic, and when an imposed filter allows the listening.
So Publish/Subscribe is data-object (Topic) based instead of message based. The paradigm is different from message based:
In 'message-based', action messages are triggering a status change in an entity.
In 'Data-based' (e.g. DDS), entities signal the session state and properties to other subscribed entities, which will cause such entity to act, and publish, also an updated session state, and properties, again to subscribed entities.

The Link Layer Discovery Protocol (LLDP) is a link layer protocol in the Internet Protocol Suite used by network devices for advertising their identity and capabilities. Media Endpoint Discovery is an enhancement of LLDP, known as LLDP-MED, that provides an auto-discovery of LAN policies for enabling plug and play networking, device and media endpoint location discovery, and inventory management.

SUMMARY OF THE INVENTION

A method for initiating a session within a publish/subscribe network comprises: publishing a first topic by a first user interface of a first device, the topic identifying the user first interface and including an address-identifier identifying a second user interface, triggering a request to start a session, starting a first media endpoint by publishing the media endpoint to the network by using a second topic for the media endpoint representing the media endpoint and describing the capabilities of the media endpoint, and when the second user interface has accepted the session, linking the first media endpoint with a second media endpoint of the second user interface.

The second media endpoint is selected in particular according to the capabilities of the first media endpoint as published with the topic representing the first media endpoint, and each media endpoint of the device publishes a topic to the network describing its capabilities, when starting up the first device, and wherein the first and the second user interfaces allocate for each audio, video or data stream a single media endpoint being a sending or a receiving media endpoint.

A publish/subscribe network enabled for multimedia signaling control comprises at least two devices, each of the devices comprising a user interface and a media endpoint for initiating and performing a session, wherein signaling is provided between the user interfaces and the endpoints of each of the devices for initiating a session. The network utilizes topics for initiating and performing the session and for allocating the user interface with a media endpoint.

In an aspect of the invention, the publish/subscribe network is a Data Distribution Service for Real-Time Systems (DDS) network and the user interfaces and the media endpoints act as Domain Participants of the DDS network for providing multimedia signalling control within the DDS network. The following Domain Participants are included in the DDS network: Initiating User Interface, Terminating User Interface, Sending Media Endpoint and Receiving Media Endpoint.

A network device comprises a user interface and an endpoint, wherein the device is adapted to start up the user interface, to publish a topic via the user interface, the topic including an address-identifier identifying a second user interface of a second device, to trigger a request to start a session, to start the media endpoint by publishing the endpoint to the network by using a topic for the endpoint representing the media endpoint and describing the capabilities of the media endpoint, and to link the media endpoint with a second media endpoint of the second user interface, when the second user interface has accepted the session.

A computer readable storage medium comprises program code instructions executable by a processor for implementing the steps of the method.

A computer program comprises program code instructions executable by a processor for implementing the steps of the method.

BRIEF DESCRIPTION OF THE DRAWINGS

Preferred embodiments of the invention are explained in more detail below by way of example with reference to schematic drawings, which show.

DETAILED DESCRIPTION OF PREFERRED EMBODIMENTS

In the following description, a publish/subscribe network enabled for multimedia signaling control and a method for initiating a session within the publish/subscribe network are described. The publish/subscribe network is for example a DDS network and provides the signalling for setting up sessions and related multimedia connections by using a publish/subscribe method. For purposes of explanation, numerous specific details are set forth in order to provide a thorough understanding of the embodiments. It will be evident, however, to one skilled in the art that the present invention may be practiced without these specific details.

Figure 1:
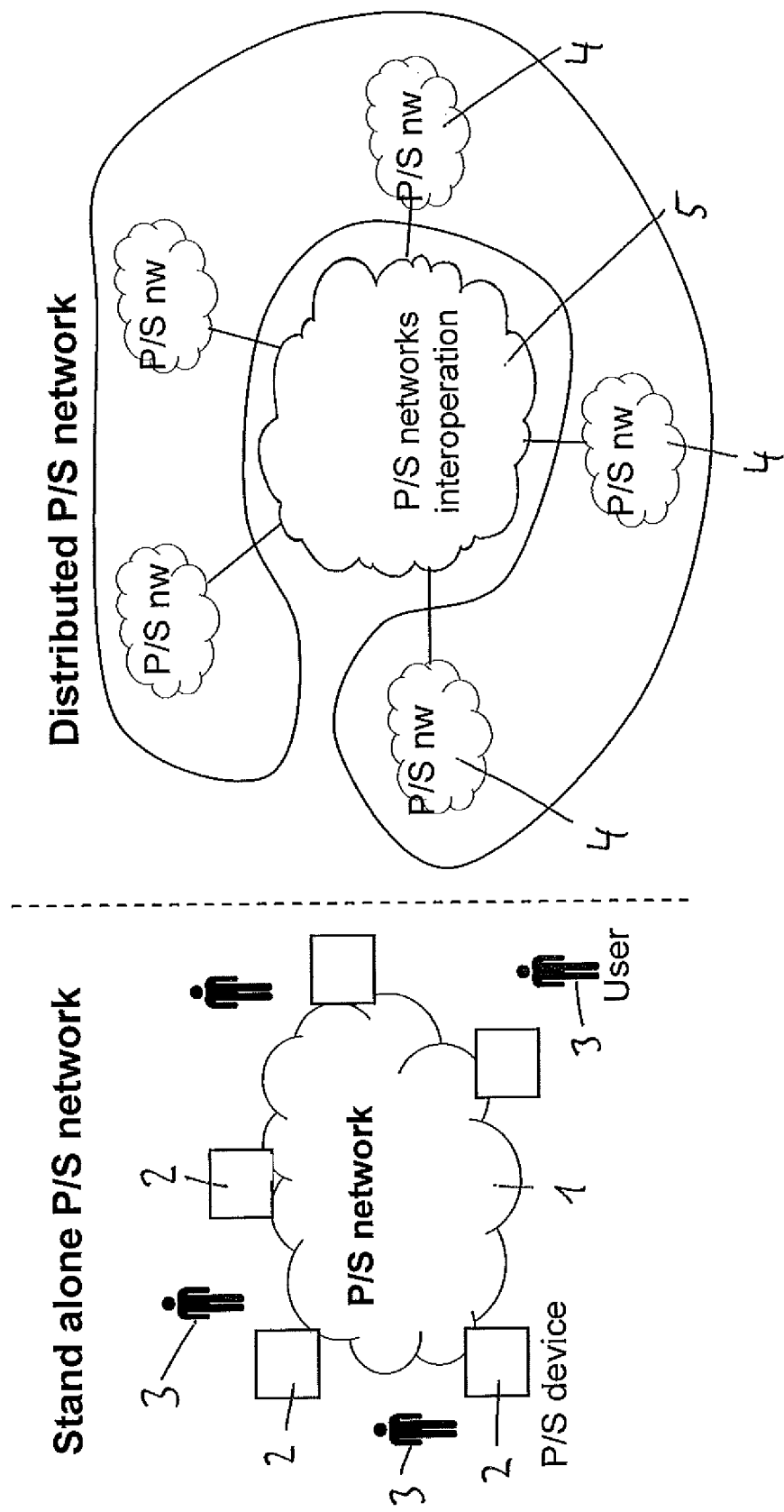
FIG. 1a a publish/subscribe home network including a multitude of devices.
FIG. 1b isolated publish/subscribe networks being connected with each other via a wide area network, FIG. 2 a home network comprising a home gateway and a multitude of devices including User Interfaces and Media Endpoints, FIG. 3a interactions between topics used in a publish/subscribe network, FIG. 3b an embodiment of a session with three parties, FIG. 4 an embodiment of a multimedia session with two users and one bidirectional connection, FIG. 5 a role of an entity user interface, FIG. 6 a role of an entity Media Endpoint, FIG. 7 a state diagram for a receiving Media Endpoint, FIG. 8 a state diagram for a sending Media Endpoint, FIG. 9 a state diagram of a multimedia session, FIG. 10 a state diagram of a party joining or leaving a session, FIG. 11 a state diagram for a party initiating a session, FIG. 12 a state diagram of a MediaEndpoint-Party_Link Topic, FIG. 13 a media flow for the embodiment of FIG. 4, FIG. 14 a message flow diagram for a start-up procedure, FIG. 15 a message flow diagram for a 2-party call session with a bidirectional audio connection, FIG. 16 a simplified flow diagram for the session according to FIG. 15, and FIG. 17 the 2-party call session of FIG. 15 in a different flow diagram.

The publish/subscribe network is arranged for example within a home network 1 including a multitude of devices 2 being enabled for DDS, as depicted in FIG. 1a. The devices 2 are controlled by users 3 and are enabled to connect with each other via publish/subscribe, for example by using a respective application within each of the devices 2. The home network 1 is in particular a secured home network and the devices 2 are Internet-enabled devices.

When leaving a DDS network, classical methods for signalling may be applied, and interoperation entities may be present as needed. Also interoperation of a DDS network with other DDS network based islands being connected via a non-DDS network may be applicable. As shown in figure 1b, isolated publish/subscribe networks 4 can connect with each other via a wide area network 5, e.g. the Internet, for example by using a forwarder entity.

In a Publish/Subscribe environment, the message approach, where a message is sent between dedicated entities of a network, is no longer applicable. Entities connected to the publish/subscribe -based network communicate on 'Topics' and value changes of its parameters that are published, to the ones subscribed. So publish/subscribe is data-object based instead of message based. The data-objects are called here Topics. The publish/subscribe paradigm is therefore different from message based:

In 'message-based', action messages are triggering a status change in an entity.

In 'Data-based', e.g. DDS, entities signal the session state and properties to other subscribed entities, which will cause such entities to act, and publish also an (Updated) session state (and properties), again to subscribed entities.

The invention shows how a multimedia session, or any call, is handled in a publish/subscribe environment, by describing a method for publish/subscribe-based multimedia signalling, and a respective publish/subscribe network. The method is in particular a signalling method for setting up sessions and related multimedia connections, wherein data streams are separated from the signalling messages.

Since, within a publish/subscribe domain, states and events of topics can be published to any entity, signalling can happen directly between endpoints like user interfaces and media endpoints. Also connections just need connected endpoint compatibility, and no intermediate switching is required.

The publish/subscribe network is in particular a Multimedia Control System within a publish/subscribe (P/S) domain. The P/S-domain is defined by domain Entities and related Topics. These domain Entities have both publisher and subscriber functionality. Domain entities of the publish/subscribe Multimedia Control System are:

User Interface (UI): sends topics for initiating a session and identifies a user, which is represented by a topic called 'Party' in the session. The user interface can originate a session, invite another user, and request Media Endpoints for connections.

Media Endpoint (ME): are endpoints able to handle a particular multimedia stream, e.g. an audio, video, or even a data stream, which can act either as sending or receiving and links them to a Party or a multitude of Parties upon request, when arranging a session. So a Media Endpoint is a connection endpoint, source or sink.

A session is initiated by a Party, respectively a user interface, not by a Media Endpoint. This initiating party is considered as the Owner of the session. The Session Owner is accountable for the system resources. As such he may have to pay for the session resources, or resources consumed may be counted with regard to his resource budget limit. The owner is the only one who is able to release the session, independent of whether other parties are still included. These other parties can only leave the session, but not release it, unless a party is the last one to leave the session. The Owner is able to transfer the ownership to another user of the session.

Figure 2:
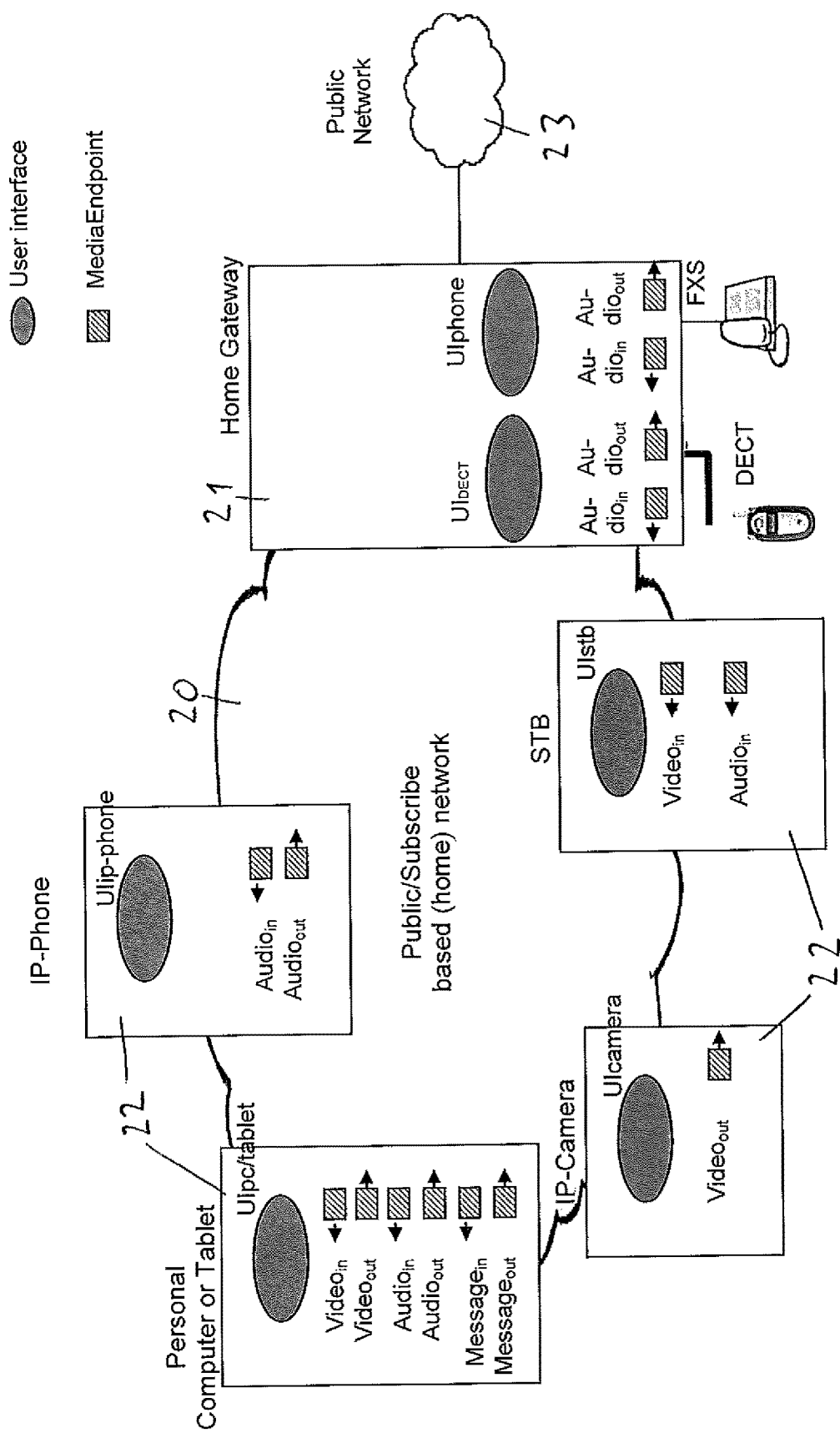

The User Interfaces and Media Endpoints can be located in principle in any equipment. A respective embodiment of a home network 20 including a home gateway 21 and a multitude of end devices 22 is shown in FIG. 2. The home gateway 21 is a Customer Premises Equipment device and acts as a gateway interface between the home network 20 and a Public Network 23, e.g. the Internet. The end devices include for example a Personal Computer or Tablet PC, a set-top box (STB), a VoIP-phone, and an Internet-enabled (IP) Camera. However, some end device functionality, like telephony or DECT service, may be integrated in the home gateway 21. In the embodiment of FIG. 2, the endpoints are located in the same device as the user interface, but it is also possible that a User Interface in a tablet controls a data stream to e.g. the set top box.

All end-devices 22 and the home gateway 21 shown in FIG. 2 include a User Interface (UI) and the following Media Endpoints:

PC/Tablet: Video-In, Video-Out, Audio-In and Audio-Out, wherein multiple of such Endpoints may be present in a single end device 22: Data-In, Data-Out STB: Video-In, Audio-In VoIP-phone: Audio-In and Audio-Out IP-camera: Video-Out Home gateway: Audio-In and Audio-Out related to a Telephony FXS interface and also to a DECT interface.

The following topics are used in the publish/subscribe based Multimedia Control System network:

Party: represents a user interface in a session

MediaEndpoint: represents a Media Endpoint, its control and its states in a session, MediaEndpointRequest: a message used by a party in order to request a particular MediaEndpoint to join in a session for a particular Party; each MediaEndpointRequest is aiming to create one MediaEndpoint-Party_Link, and MediaEndpoint-Party_Link: associates a particular endpoint in a particular session for a particular Party. One MediaEndpoint Topic can have multiple MediaEndpoint-Party_Links.

Figure 3A:
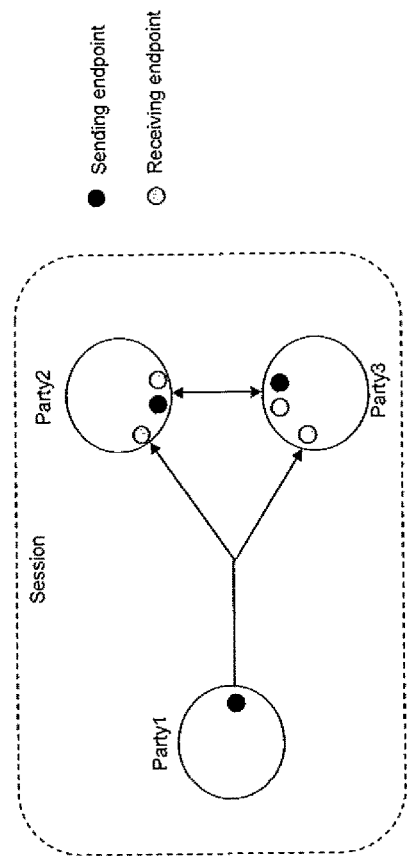

Relations between the above topics and a session are shown in FIG. 3*a*. With an originating Party topic 31, a user interface selects a new, non-used SessionId and as such a session is inizialized. The Session is virtual and is 'gone' as soon as all Parties and all MediaEndpoint-Party_Links have released the session, or if the Owner of the session has released the session. The SessionID is in particular a Universal Unique Identifier (UUID) used to uniquely identify the session. The session 30 is no topic as such and is dashed, since it can be implicit or explicit.

The relations between the topics and the session are depicted in FIG. 3*a* by straight lines and the session and the topics have the following characteristics:

A session may contain m MediaEndpoints and p Parties (m>=0 and p>0).

A Party may issue r MediaEndpointRequests, in series or parallel. Each MediaEndpointRequest is a request for one MediaEnpoint-Party_Link.

Each Party may have n MediaEnpoint-Party_Links. Each MediaEnpoint-Party_Link represents a relation between one MediaEndpoint and one Party.

Each Party may be linked to n MediaEndpoints, via n MediaEndpoint-Party_Links.

Figure 3B:
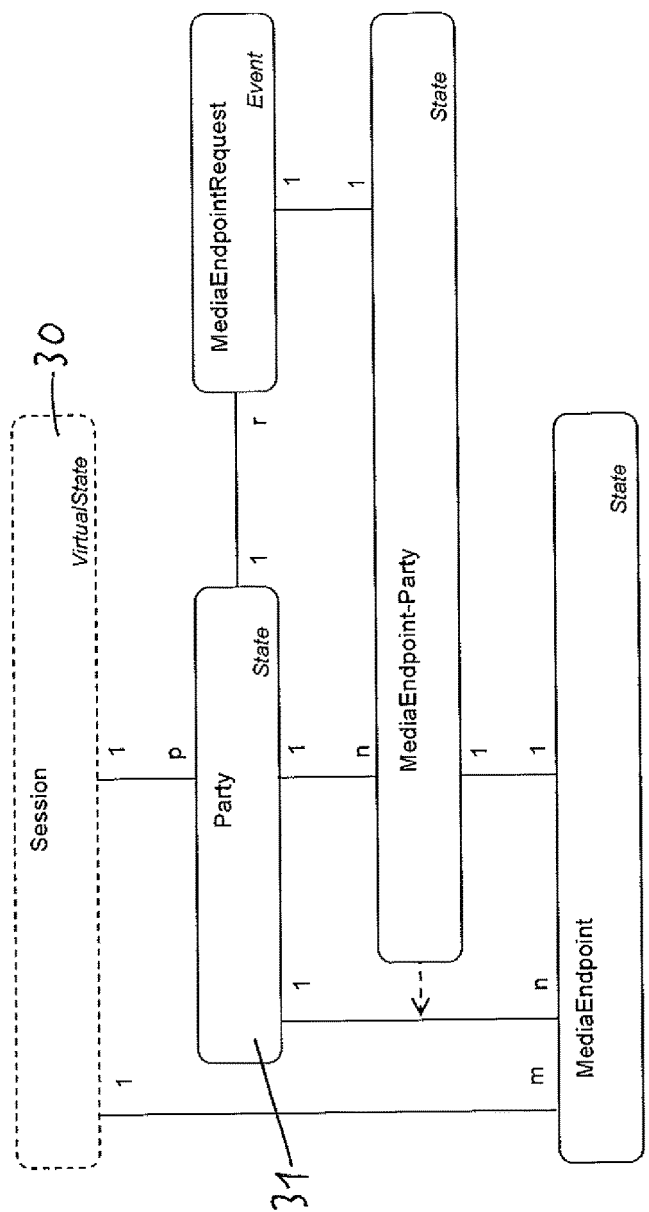

An embodiment of a session with three parties Party1, Party2 and Party3 is shown in FIG. 3*b*. There is established a multicast connection from Party1 to Party2 and Party3. There is also a bidirectional connection between Party2 and Party3. It is supposed that every MediaEndpointRequest was successful. In that case is:

P=3 parties r=n=1 for Party1 r=n=3 for Party2 r=n=3 for Party3 m=7 MediaEndpoints (=sum(n of every party))

When devices are powered up and are connected within the network, they publish available information as multicast messages within the network and subscribe to data that they are interested in. After the power up, no session is present yet for a device. Each device publishes its static information.

Figure 4:
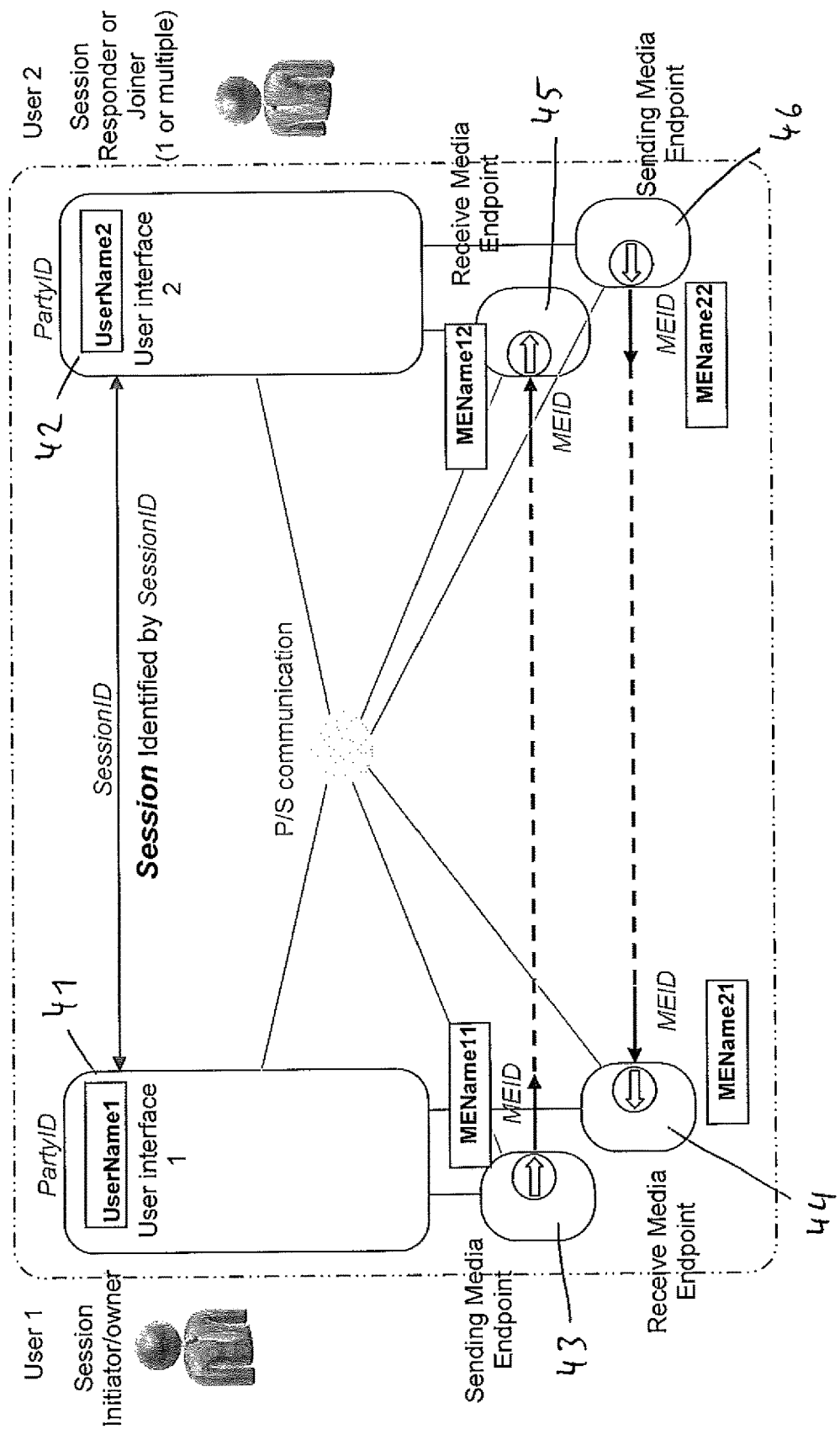

Sessions are dynamically created and terminated. The publish/subscribe signaling acts on two control levels: Session and Party level and MediaEndpoint level. An embodiment of a multimedia session with two users and one bidirectional connection using Publish/Subscribe for signalling is shown in FIG. 4. This figure is a conceptual scheme indicating Publish/Subscribe communication relations between entities: user interfaces and endpoints, and only shows functional entities, no entities in devices. Some entities can be grouped in devices, or entities may be in quite different devices, e.g. a User interface may be on a tablet and media endpoints may be in a set-top box.

The session shown in FIG. 4 is initiated by a first user, User 1, via a User Interface 41 assigned to User 1. User 1 is the first party joining the session. Later, a second user, User 2, joins the session, and Media Endpoints are added. By using above described topics, a sending endpoint 43 and a receiving endpoint 44 are assigned to the user interface 41, and a sending endpoint 46 and a receiving endpoint 45 are assigned to the user interface 42. The sending endpoint 43 and the receiving endpoint 45 are linked, and the sending endpoint 46 and the receiving endpoint 44 are linked.

Figure 5:
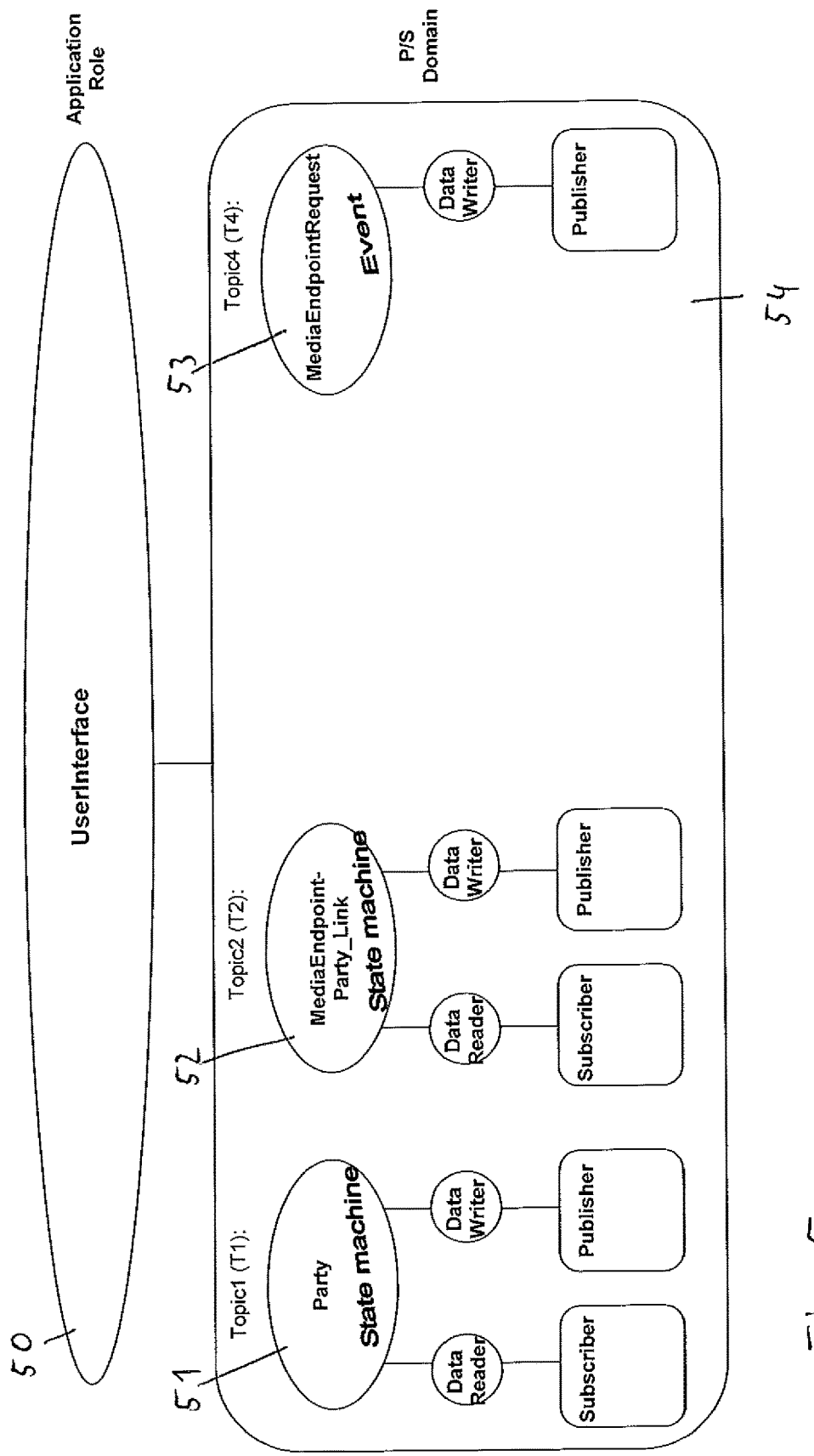

The role of the entity "user interface" is illustrated in FIG. 5. The user interface 50 uses the topics Party 51, MediaEndpoint-Party-Link 52 and MediaEndpointRequest 53. The topics 51 and 52 have each publisher and subscriber functionality by using a respective Data Reader and a Data Writer, and the topic 53 has only a Publisher functionality including a Data Writer. Via the topics 51-53, the user interface 50 is able to connect with other user interfaces within the publish/subscribe network 54.

Figure 6:
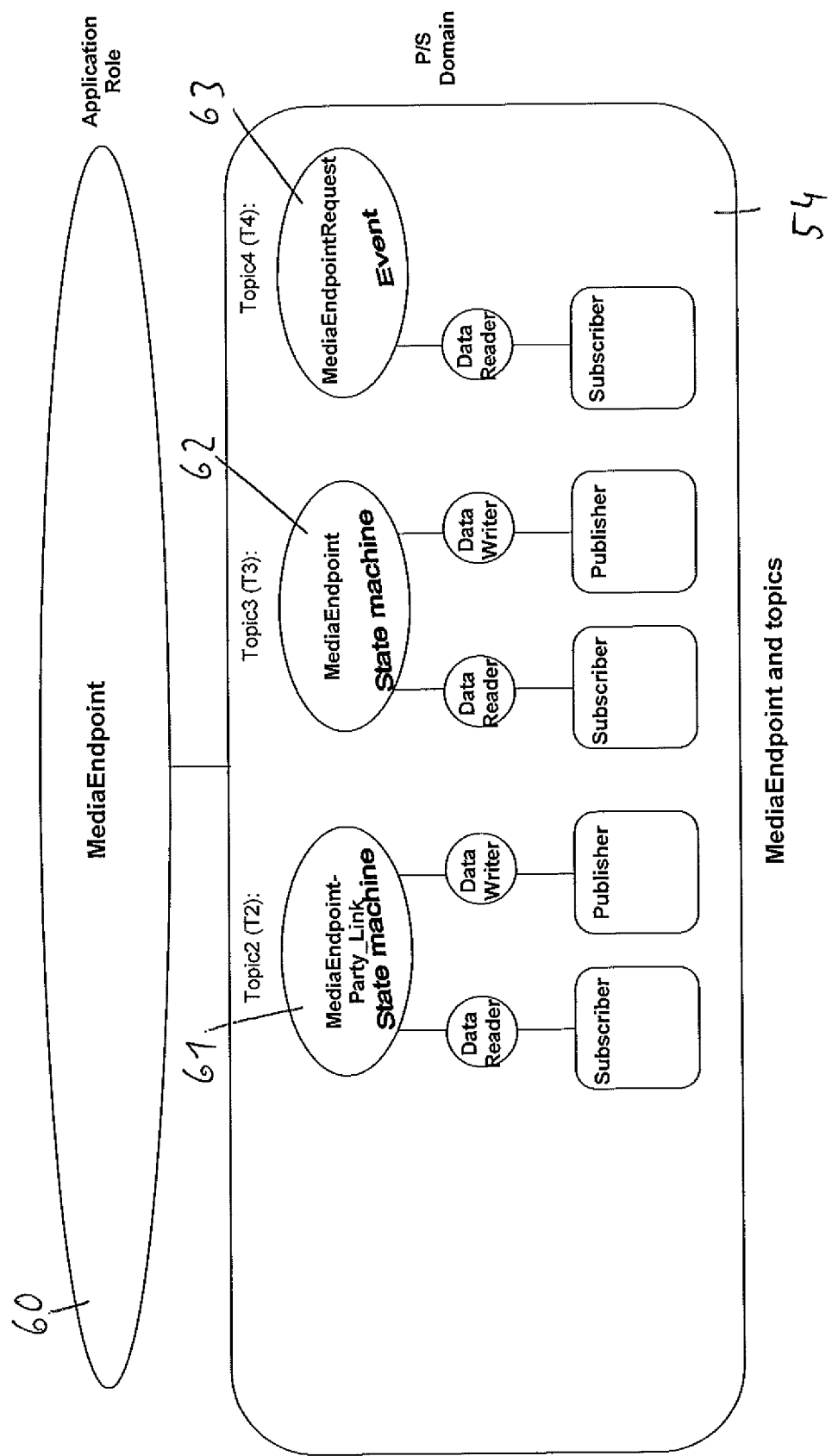

The role of the entity: "Media Endpoint" is illustrated in FIG. 6. A Media Endpoint 60 utilizes the topics MediaEndpoint-Party_Link 61, MediaEndpoint 62 and MediaEndpointRequest 63. With the topics 61-63, signaling is provided to initiate and terminate connections between Media Endpoints within the publish/subscribe network 54 of a session.

Figure 7:
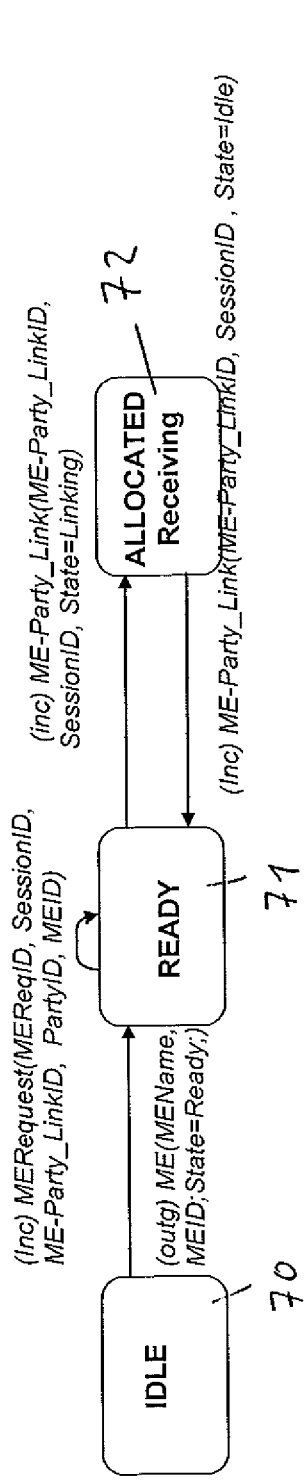

In the following FIGS. 7-12 state diagrams for Media Endpoints occurring within a session are illustrated. FIG. 7 shows the state diagram of a receiving Media Endpoint, which is after startup of a session in an Idle state 70. When the Media Endpoint has published its availability, it is in a state Ready 71 and when it is used in a session, it is in an Allocated Receiving state 72.

Figure 8:
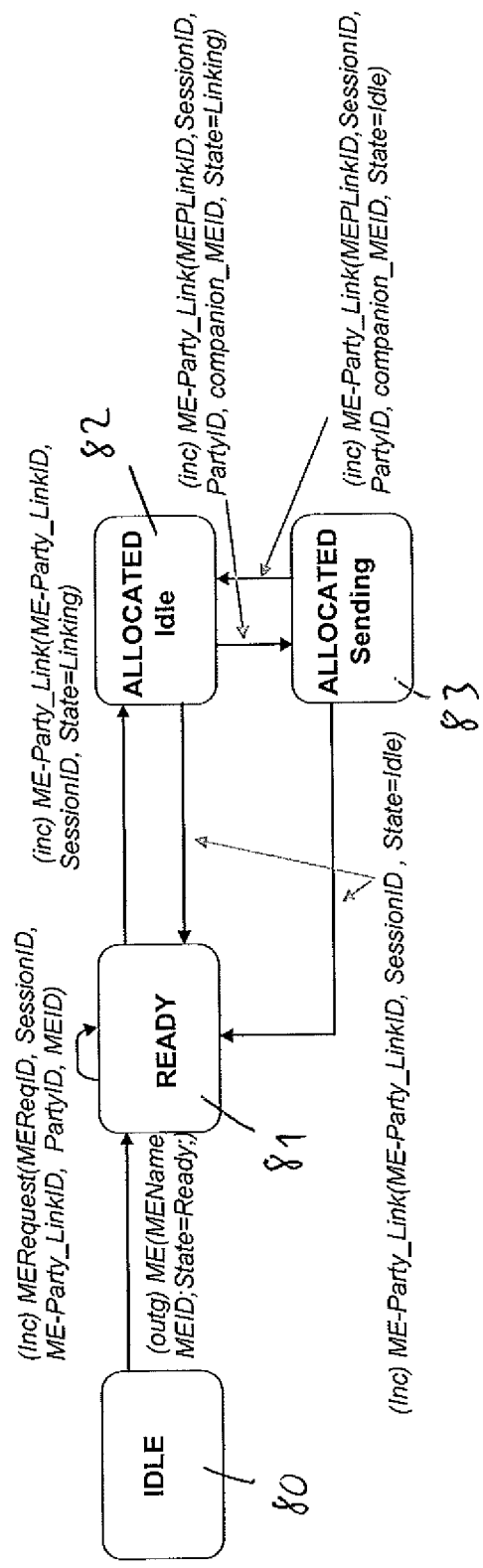

A state diagram for a sending Media Endpoint is illustrated in FIG. 8. After startup, the sending Media Endpoint is in an Idle state 80. After it has published its availability, the sending Media Endpoint is in a Ready state 81. The Media Endpoint will only send when it sees that a counterpart receiving Media Endpoint is allocated, e.g. after the receiving Media Endpoint has published its data. Before linked with the receiving Media Endpoint, the sending Media Endpoint is in an Allocated Idle state 82, and when both Media Endpoints are linked, the sending Media Endpoint is in the state Allocated Sending 83.

A state diagram of a session is illustrated in FIG. 9. When a party starts a session, the party is the owner of the session and the session is in an Idle state 90. When the party publishes a session ID, the session is in an Ready state 91. When a first party joins this session, then links between Media Endpoints are created for the session, after which a session is in an Active state 92. When all invited parties have left the session, the session returns from the Active state 92 to the Ready state 91. When the owner party releases the active session, or a timeout occurs in the session Ready state 91, e.g. no party joins the session, the session returns to the state 90: Idle.

When the session is in the Active state, a party may join the session after an invitation, or spontaneously. A party state diagram of a party joining or leaving a session is shown in FIG. 10, indicating that the party is in an Idle state 100, before the party has joined the session or after having left the session. The party is in a state Joined 101, when having joined a session.

Figure 11:
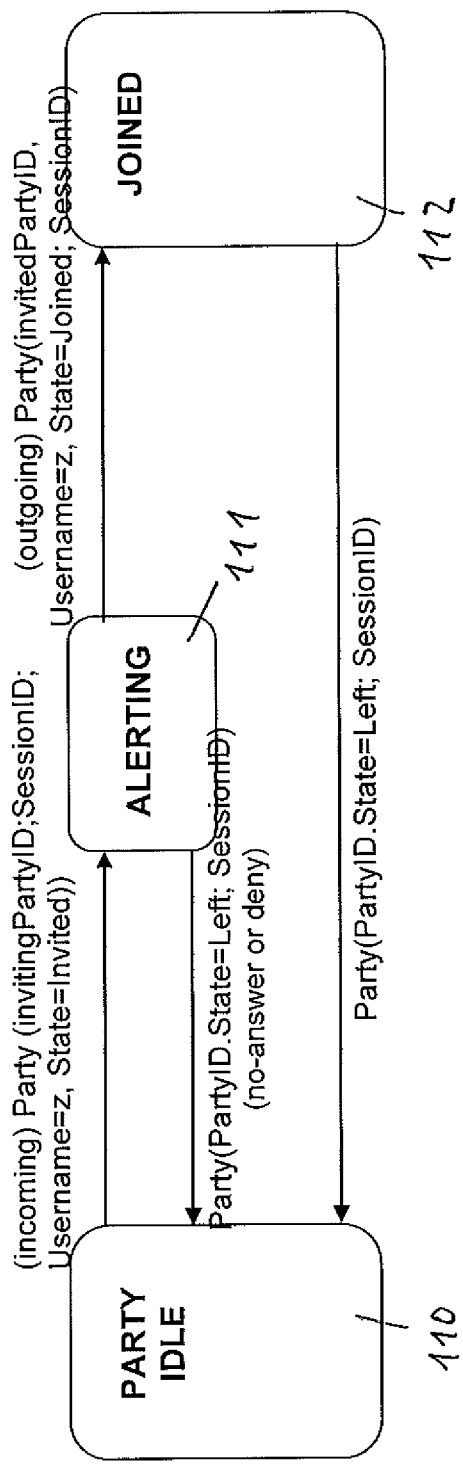

A party state diagram for a party invited in a session is illustrated in FIG. 11, which shows that the invited party is in an Idle state 110 after the session is started. The invited party enters the Alerting state 111, when it is invited in the session by an inviting party. When the invited party joins, the party state of the invited party is the state Joined 112. When the invited party doesn't answer or denies joining, the party state of the invited party returns to the state Idle 110.

Figure 12:
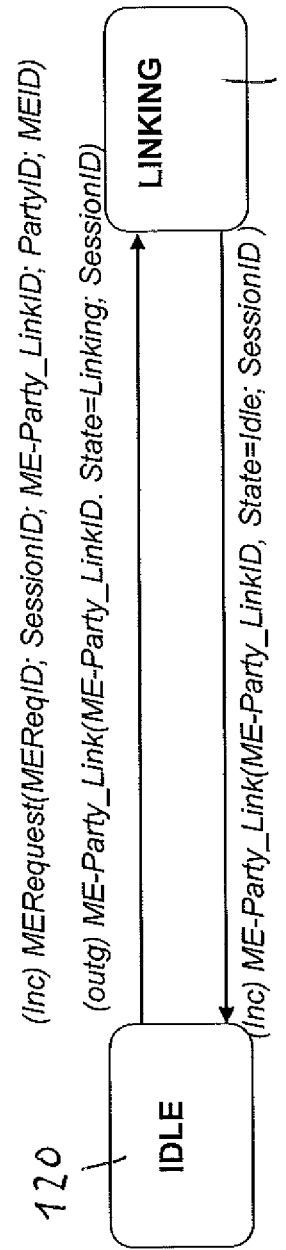

A state diagram of the MediaEndpoint-Party_Link Topic is illustrated in FIG. 12. A MediaEndpoint-Party_Link topic is created when a party requests for a Media Endpoint. The MediaEndpoint-Party_Link is representing a link between a particular Party and a particular Media Endpoint. So a MediaEndpoint-Party_Link Topic does not exist at the start of a session, or at the startup of a Party or the startup of a Media Endpoint. A MediaEndpoint-Party_Link is the result of a MediaEndpointRequest event issued by a Party, according to FIG. 3. The states of a MediaEndpoint-Party_Link are either Idle 120 or Linking 121. In the Idle state, the Topic is not used. In the Linking state, the Topic links a Media Endpoint to a Party.

The principles for handling Media Endpoints, within a session, are the following:

Media endpoints are either sending (source) or receiving (sink).

The state (and sessionID) of Media Endpoints is published and all UserInterfaces and Media Endpoints are able to see this in the P/S network that they belong too.

A counterpart of a Media Endpoint (a source for a sink, or a sink for a source) is another media endpoint with the same parameters, e.g. Session Description Protocol (SDP) parameters, but different direction, to which it will be connected.

A Media Endpoint is linked to a particular Party via one MediaEndpoint-Party_Link topic; a Media Endpoint can be linked to multiple different Parties, each separate link represented via one MediaEndpoint-Party_Link topic.

The principles for connecting Media Endpoints are the following:

A source Media Endpoint is always uni-directionally connected to a sink Media Endpoint.

Media Endpoints are only connected to another Media Endpoint which has exactly the same description, e.g. SDP description, except for the direction which must be opposite. (Note: this may include e.g. indication of Left or Right audio stereo).

Media Endpoints are subscribed-to and seeing the published MediaEndpoint-Party_Link information. This is important e.g. for a source Media Endpoint to verify that the sink Media Endpoint is actually linked, and by consequence ready to receive information. After a source Media Endpoint has verified that the sink Media Endpoint is ready, it can start sending; the connection is then established.

This actually means that the presence of a MediaEndpoint-Party_Link topic for a Media Endpoint is equivalent to 'MediaEndpoint_Ready': to receive or to send.

If a source Media Endpoint sees multiple compatible (see SDP) sinks, it issues a point-to-multipoint stream.

If a Media Endpoint starts up, it is in the Idle state. After it publishes its availability, it is in the Ready (to be used) state.

If a sink Media Endpoint sees multiple compatible sources (see SDP), it prepares to receive multiple streams. It is open whether the streams are mixed (e.g.) audio, or are separately presented to a user (e.g. video), or any other combination is applied.

The state of a Media Endpoint is either 'linked' or 'not_linked' to a party. 'Linked' status is implicit by the presence of a MediaEndpoint-Party_Link topic. Media Endpoint states are respectively «Allocated» (linked) or Ready (not_linked).

An Allocated Media Endpoint is either idle, sending or receiving. A sink Media Endpoint that is allocated is immediately in state Receiving, even if nothing is sent yet. A source Media Endpoint is in an Allocated Idle state, until it is notified that its counterpart Media Endpoint is in an Allocated Receiving state. This assures that no sent information is lost.

Figure 13:
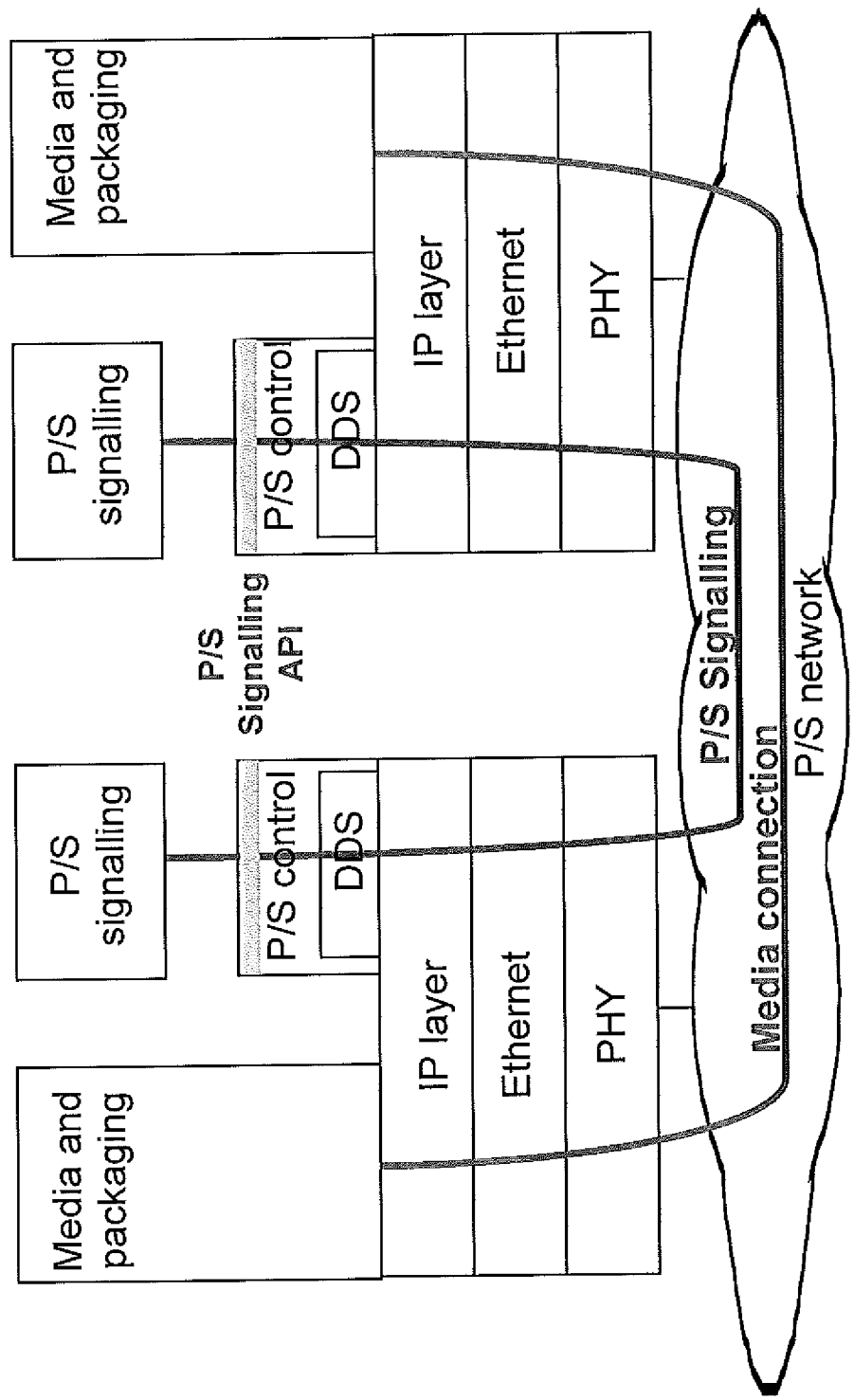

The publish/subscribe signaling of the network acts correspondingly on two control levels: on the Session and Party level and on the Media Endpoint level. A signal flow and a media flow of the embodiment according to FIG. 4 is shown in FIG. 13. The signaling is done via Publish/Subscribe, in this embodiment by using DDS, and when the user 2 has joined the session, media streaming is performed between the endpoints by using a streaming connection between the Internet Protocol layer 3 of each device, without using DDS. The Publish/Subscribe functionality of the network is therefore only used for initiating the session, and when all users have joined the session, media streaming is performed directly between the endpoints, without using Publish/Subscribe.

When a device of the network starts up, it starts up its user interface which performs the following: It requests the user of the device to identify himself, if not default; it publishes the Party topic to the network; and it watches possible incoming session calls or a trigger request from the user to start a session. The device also starts its endpoints by publishing its available endpoints to the network. This published information is 'state' information, and as such it is available to other devices that start up later than the present device.

The start-up procedure is performed in particular by a Publish/Subscribe Control application included in the device. Whether the application needs to stay active and whether the Endpoints need to be instantly available any time after start-up may depend on the device. Due to energy saving reasons, the application may stop and may be restarted when needed later.

Figure 14:
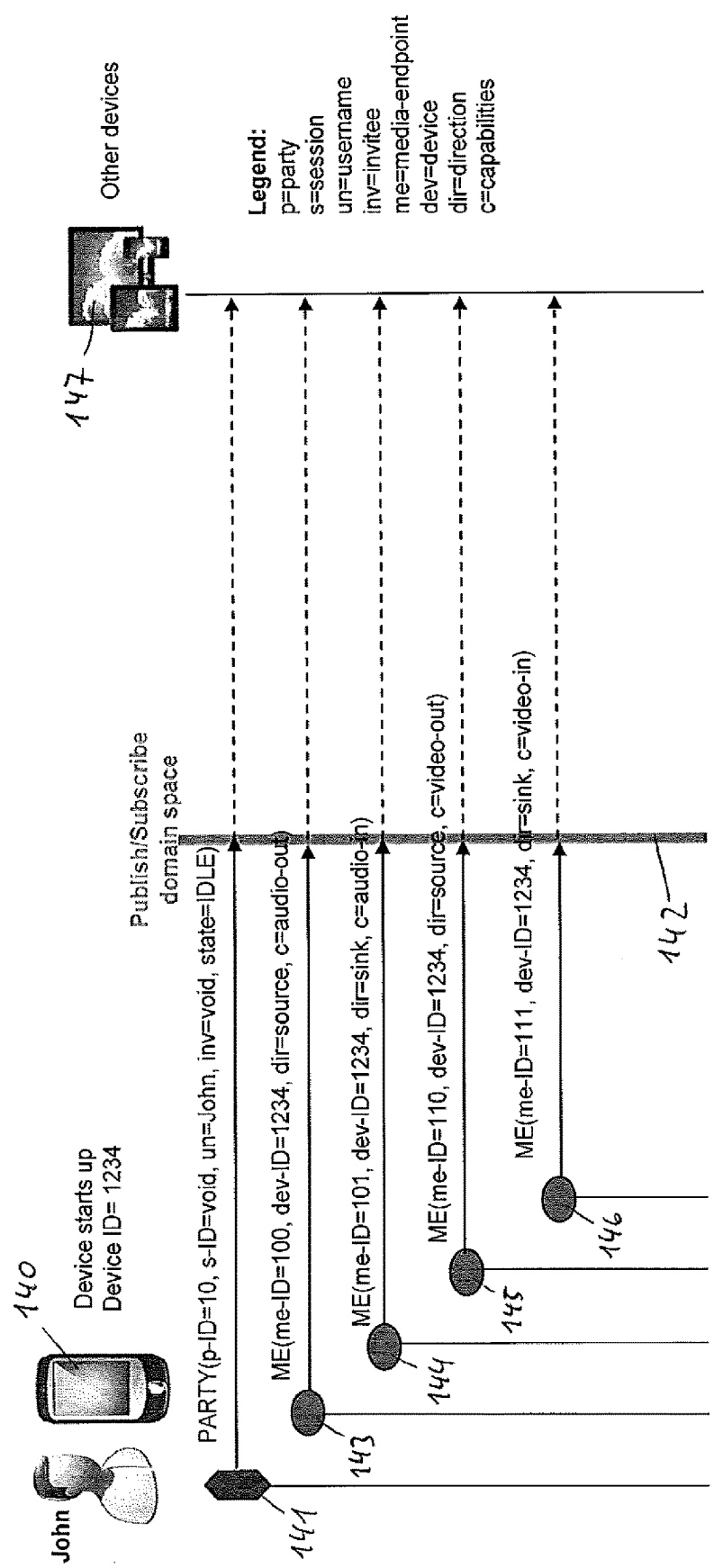

An embodiment of a communication start-up procedure is shown in FIG. 14. At the start-up of a device 140, the device sends a topic Party 141 to a Publish/Subscribe network 142 including the parameters party ID: 10, name of the user of the device: John, and its state: Idle. The device has four media endpoints for audio in and out and for video in and out. Each endpoint sends a respective topic MediaEndpoint 143-146 to a Publish/Subscribe network 142 including its parameters and the parameter device ID of the device. The party-ID is chosen as a non-existing one on the Publish/Subscribe network. The device-ID may have been preconfigured in the Publish/Subscribe network. Also the username may have been preconfigured in the device. The network includes further devices 147, e.g. a television set, a tablet PC and/or a notebook. The device 140 then watches possible incoming session calls, or a trigger request from the user to start a session.

Figure 15:
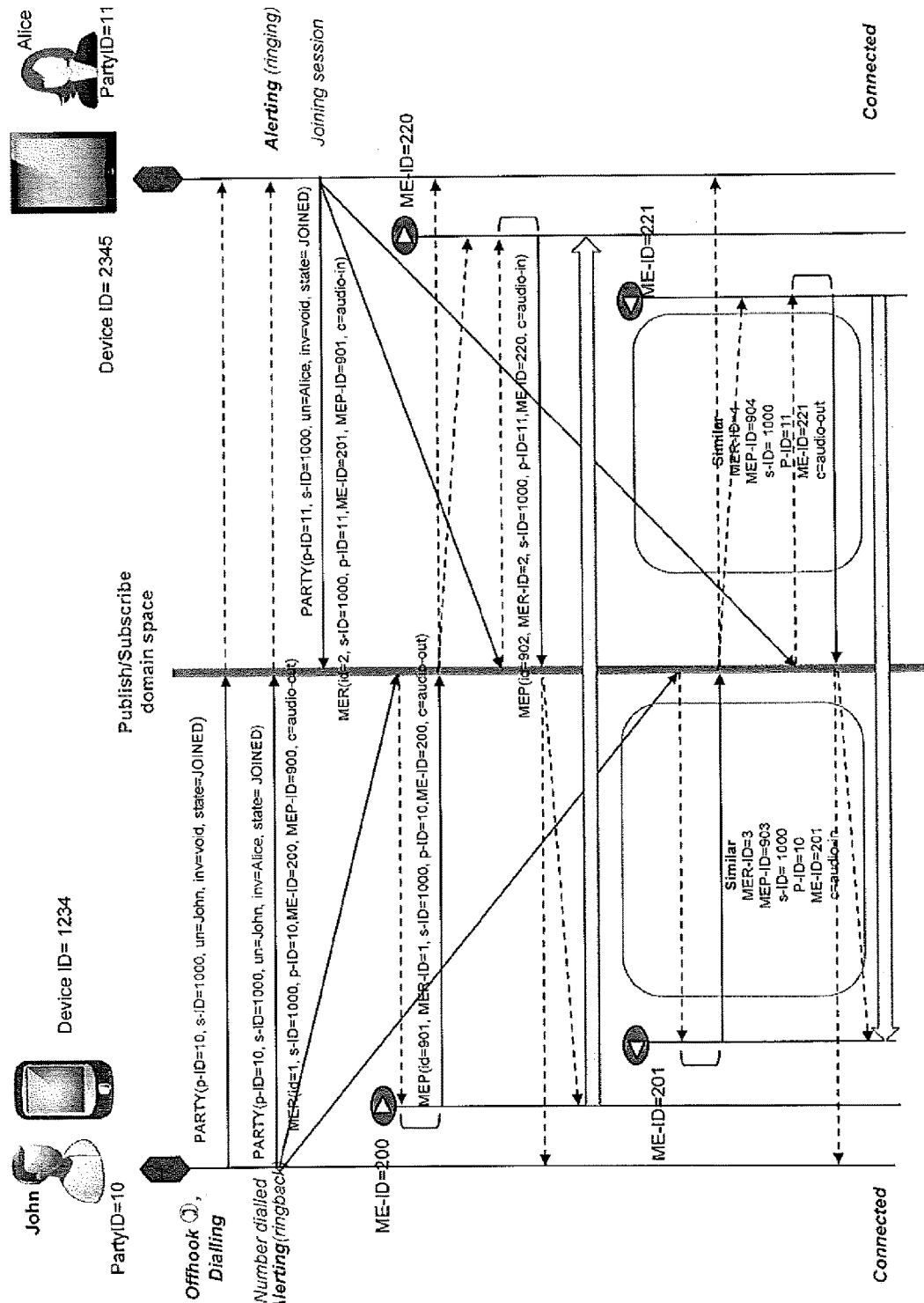

In FIG. 15, a 2-party call setup with a bidirectional audio connection is illustrated. A user John has entered a Publish/Subscribe network, has powered up his smartphone and the included Publish/Subscribe Control application has been run, e.g. the actions in example according to FIG. 14 have been performed. Now John wants to call user Alice for a telephone conversation, using the Publish/Subscribe network. The flows starting with dialling, alerting, until being connected are illustrated in the FIG. 15.

The actions are as follows:
John (partyID10) sets up the session (sessionID=1000)
John dials to Alice (invitee=Alice); Alice=partyID11
Meanwhile, the device of John allocates sending and receiving endpoints:
  MER(1) to request MEP(901)=association between party10 and ME 200
  ME=MediaEndpoint
  MER=MediaEndpointRequest
  MEP=MediaEndpointParty
  MER(3) to request MEP(903)=association between party10 and ME 201
Alice's device is ringing and Alice accepts (joins) the session Meanwhile, the device of Alice allocates sending and receiving endpoints:
  MER(2) to request MEP(902)=association between party11 and ME 220
  MER(4) to request MEP(904)=association between party11 and ME 221
As soon as the corresponding receiving endpoint is allocated, the sending endpoint starts sending audio once it is allocated; the endpoints are aware of each other due to the published information.

Figure 16:
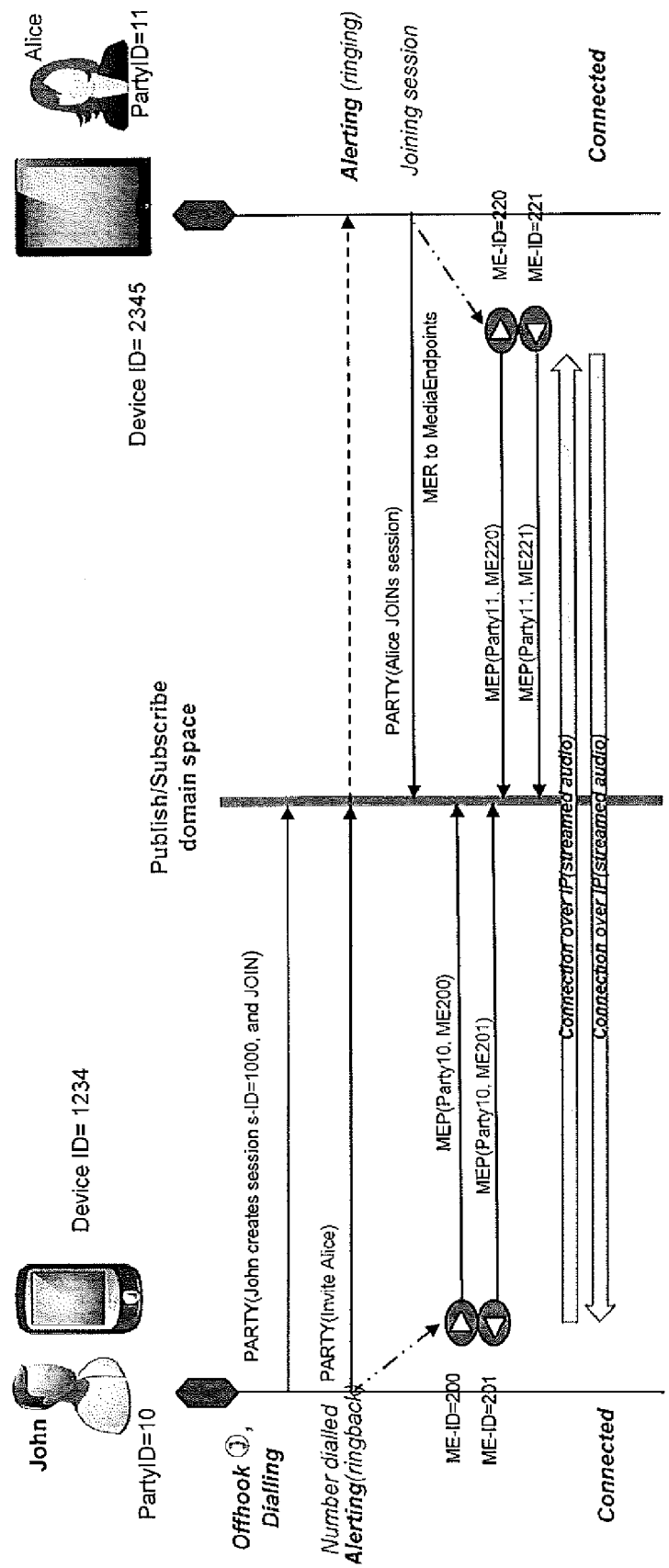

The FIG. 15 includes detailed parameter information and is therefore rather complex. The FIG. 16 presents a simplified flow diagram for the session according to FIG. 15. It focuses on 'changes' rather than on all parameters. Also the 'Reading' by subscribed entities is no longer shown. It is understood that the subscriptions are well configured.

Figure 17:
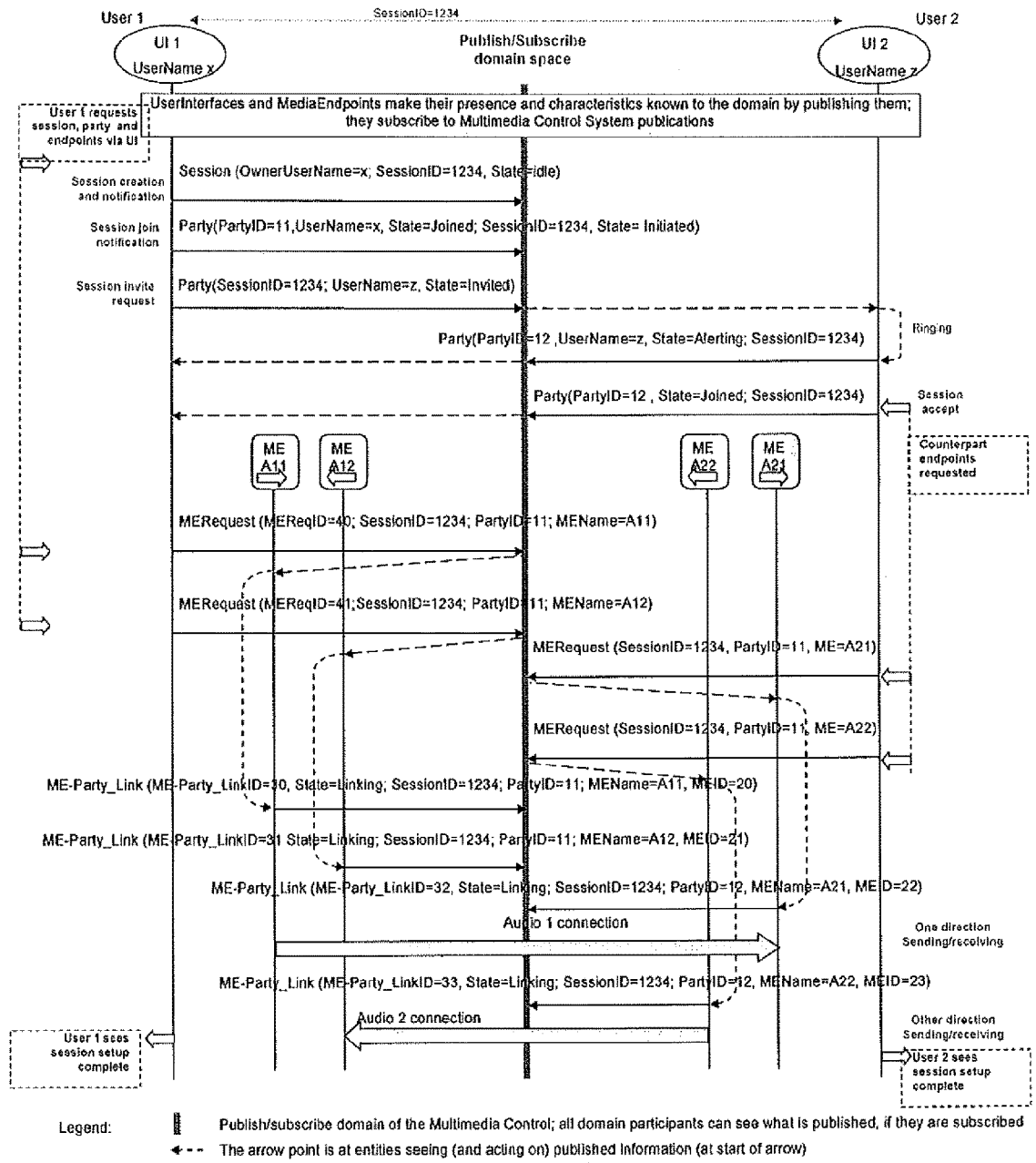

In FIG. 17, a 2-party call setup with a bidirectional audio connection similar to FIG. 15 is shown in a different flow diagram. As illustrated in the FIG. 17, a User 1 requests a session to User 2 with a bidirectional audio connection. The following actions occur:
Parties and endpoints publish their existence in the publish/subscribe Multimedia Control System domain.
UI1 sets up a session, of which he is the owner; UI1 as Party 11 joins this session, UI 1 requests User 2 to join.
Alerting is applied at User 2, and User 2 joins as Party 12.
Meanwhile, UI1 has requested MediaEndpoints A11 and A12 for allocation (A=Audio).
UI2 gets these publications, and requests counterpart MediaEndpoints A21 and A22.
A MediaEndpoint-Party_Link is created for these four endpoints. The MediaEndpoint-Party_Links enter the Linking state, after which the related Media Endpoints are allocated.
As soon as a sink Media Endpoint is allocated, the related source Media Endpoint enters the Allocated sending state.
Finally, a session with bidirectional connection is realized.

Therefore, within a Publish/Subscribe domain, states and events of topics can be published to any entity, if subscribed to them, and signalling can happen directly between endpoints like user interfaces and media endpoints. Also connections just need connected endpoint compatibility, and in an IP world no intermediate switching is required.

Also other embodiments of the invention may be utilized by one skilled in the art without departing from the scope of the present invention. The network is in a preferred embodiment a DDS publish/subscribe network, but also other topic-based publish/subscribe methods, e.g. D-Bus, may be used according to the invention. The invention resides therefore in the claims herein after appended.

The invention claimed is:

1. A method for initiating a session within a publish/subscribe network, the method comprising:
publishing a first topic by a first user interface of a first device, the first topic identifying the first user interface and including an address-identifier identifying a second user interface of a second device;
triggering a request to start a session:
starting a first media endpoint by publishing the first media endpoint to the publish/subscribe network by using a second topic for the first media endpoint representing the first media endpoint and describing the capabilities of the first media endpoint; and linking the first media endpoint with a second media endpoint of the second user interface, after it is determined that the second user interface has accepted the session.

2. The method of claim 1, wherein the second media endpoint is selected according to the capabilities of the first media endpoint as published with the second topic representing the first media endpoint.

3. The method of claim 1, wherein the first topic identifying the first user interface includes a session reference number being a unique identification number within the publish/subscribe network.

4. The method of claim 1, wherein the first media endpoint of the first device publishes the second topic to the publish/subscribe network describing its capabilities, when starting up the first device, and wherein the first and the second user interfaces allocate for each audio, video or data stream a single media endpoint being a sending or a receiving media endpoint.

5. The method of claim 1, comprising: requesting a session, a party, and media endpoints via the first user interface, the first user interface publishing one or more of:
- a session creation notification including a user name and a session identification number (ID);
- a session join notification including the user name and a party ID; and
- a session invite notification including the session ID and the user name of the second user interface.

6. The method of claim 5, wherein, in response to the session invite notification, the second user interface publishes a first notification including the session ID, the party ID, and alerting state information; and when the session is accepted, the second user interface publishes a second notification comprising a session accept notification including the session ID and joined state information.

7. The method of claim 6, wherein, after the second notification of the second user interface:
- the first user interface requests two media endpoints for allocation;
- the second user interface requests two counterpoint media endpoints for allocation; and
- the two media endpoints of the first user interface are linked with the two counterpoint media endpoints of the second user interface, after which the session setup is complete.

8. The method of claim 1, wherein the publish/subscribe network is enabled for multimedia signaling control, the publish/subscribe network comprises at least two devices, the first device including the first user interface and the second device including the second user interface for initiating and performing a session, wherein signaling is provided between the user interfaces and the first and second media endpoints of the first device and second device for initiating the session.

9. A publish/subscribe network enabled for multimedia signaling control, the publish/subscribe network comprising at least two devices, each of the two devices including a user interface and a media endpoint for initiating and performing a session, wherein:
- the at least two devices provide signaling between respective user interfaces and respective media endpoints of each of the at least two devices for initiating the session; and
- the publish/subscribe network utilizes topics for initiating and performing the session between the at least two devices, the topics including at least a topic Party representing one of the user interfaces, a topic MediaEndpoint representing one of the media endpoints, a topic MediaEndpointRequest used in order to request any one media endpoint to join in a session for a particular one of the user interfaces, and a topic MediaEndpoint-Party Link for associating a particular media endpoint in the session for a particular one of the user interfaces.

10. The publish/subscribe network of claim 9, wherein the user interfaces of the at least two devices utilize topics for initiating the session, the topics including at least the topic MediaEndpoint, the topic MediaEndpointRequest and the topic MediaEndpoint-Party Link, and wherein the media endpoints utilize the following topics for initiating and performing the session: the topic Party, the topic MediaEndpointRequest, and the topic MediaEndpoint-Party Link.

11. The publish/subscribe network of claim 9, wherein the user interface of at least one of the at least two devices uses the topic MediaEndpointRequest for allocating one media endpoint, by using a topic MediaEndpoint-Party Link to link the media endpoint with the user interface.

12. The publish/subscribe network of claim 9, wherein the media endpoint of at least one of the at least two devices is one of a sending media endpoint and a receiving media endpoint, and wherein the user interfaces of each of the at least two devices act as one of an initiating user interface and a terminating user interface.

13. The publish/subscribe network of claim 9, wherein the publish/subscribe network is a Data Distribution Service for Real-Time Systems (DDS) network and the user interfaces and the media endpoints of each of the at least two devices act as Domain Participants of the DDS network for providing multimedia signaling control within the DDS network, and wherein the Domain Participants are included in the DDS network and comprise an Initiating User Interface, a Terminating User Interface, a Sending Media Endpoint, and a Receiving Media Endpoint.

14. The publish/subscribe network of claim 9, wherein the publish/subscribe network is implemented within a home network.

15. A first device in a publish/subscribe network, the first device comprising a user interface and a media endpoint, wherein, when the first device starts up the user interface, the user interface publishes a topic, the topic including an address-identifier identifying a second user interface of a second device in the publish/subscribe network to trigger a request to start a session; and
- the media endpoint of the first device is started up by publishing the media endpoint to the publish/subscribe network by using a topic for the media endpoint representing the media endpoint and describing the capabilities of the media endpoint linking the media endpoint with a second media endpoint of a second user interface of a second device, after it is determined that the second user interface has accepted the session.

16. The first device of claim 15, further comprising a processor to:
- request a session, a party, and endpoints via the user interface;
- enable the user interface to publish at least one of:
  - a session creation notification including a user name and a session identification number (ID);
  - a session join notification including the user name and a party ID; and
  - a session invite notification including the session ID and the user name of the second user interface.

17. A non-transitory computer-readable storage medium comprising computer-executable instructions to enable a processor of a device to perform a method comprising:
- publishing a first topic by a first user interface of a first device, the first topic identifying the first user interface and including an address-identifier identifying a second user interface of a second device;
- triggering a request to start a session;
- starting a first media endpoint by publishing the first media endpoint to the publish/subscribe network by using a second topic for the first media endpoint representing the first media endpoint and describing the capabilities of the first media endpoint; and
- linking the first media endpoint with a second media endpoint of the second user interface, after it is determined that the second user interface has accepted the session.

\* \* \* \* \*